(No Model.)
F. H. ACKERMAN.
GRAIN FEEDER AND BAND CUTTER FOR THRESHING MACHINES.
No. 597,252. Patented Jan. 11, 1898.
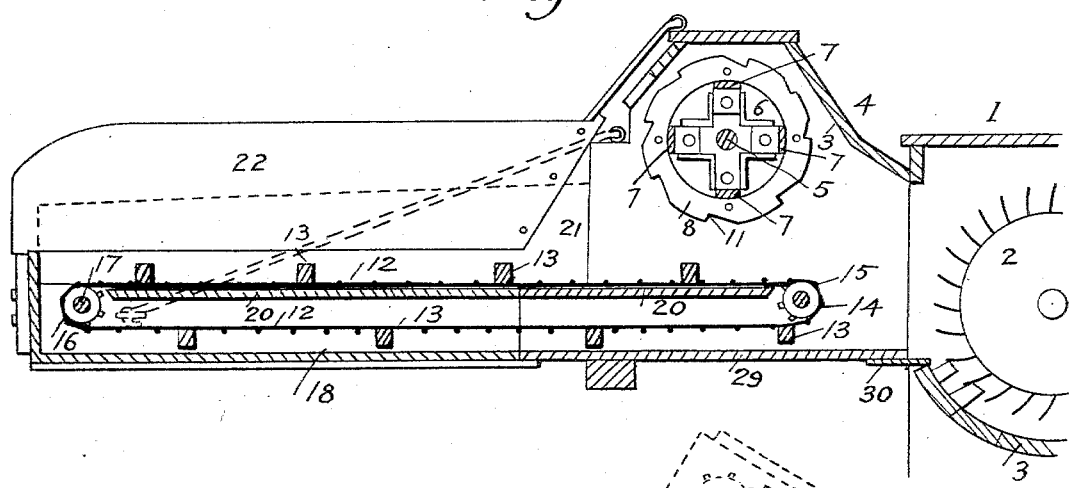
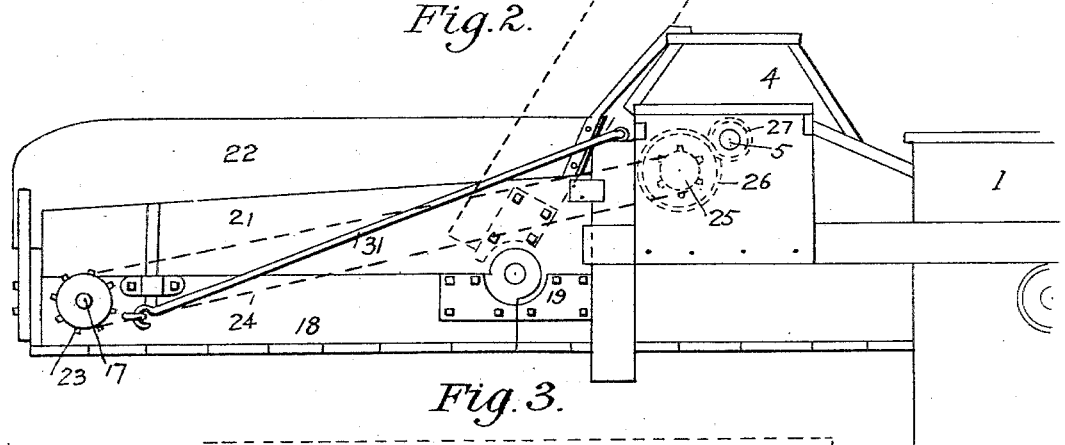
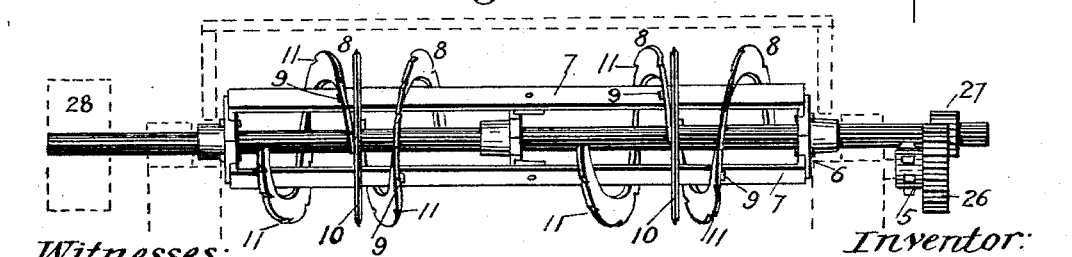

UNITED STATES PATENT OFFICE.

FEIKE H. ACKERMAN, OF SHEDDS, OREGON.

GRAIN-FEEDER AND BAND-CUTTER FOR THRESHING-MACHINES.

SPECIFICATION forming part of Letters Patent No. 597,252, dated January 11, 1898.

Application filed September 14, 1897. Serial No. 651,650. (No model.)

*To all whom it may concern:*

Be it known that I, FEIKE H. ACKERMAN, a citizen of the United States, residing at Shedds, in the county of Linn and State of Oregon, have invented new and useful Improvements in Grain-Feeders and Band-Cutters for Threshing-Machines, of which the following is a specification.

This invention relates to grain-feeders and band-cutters for threshing-machines, and has for its object to improve that class of attachments for feeding bundles of grain to separators or threshers in which a spiral cutter is employed to cut the bands of the grain bundles and spread the grain while being carried forward to the cylinder or beater.

The invention consists in features of construction and novel combinations of parts in a combined band-cutter and feeder, as hereinafter more particularly described and claimed.

In the annexed drawings, illustrating the invention, Figure 1 is a vertical longitudinal section of my improved band-cutter and grain-feeder in position for operation. Fig. 2 is a side elevation of the same, showing in dotted lines the grain-feeder or bundle-carrier as folded upward when not in use. Fig. 3 is a front elevation of the spirally-arranged toothed knives or cutters mounted on a slatted spider-frame carried by the rotary band-cutter shaft.

Referring to the drawings, the numeral 1 designates a portion of the separator-frame, 2 the cylinder, and 3 the concave.

Attached to the separator-frame, as shown, is a hood or housing 4, in which is suitably mounted the transversely-arranged shaft 5 of the rotary band-cutter and grain-spreader. This shaft 5 has secured thereto at suitable intervals a series of radial arms or spider-frames 6, that are provided for the purpose of supporting a series of longitudinally-arranged slats 7, parallel with and inclosing the said shaft, the whole constituting a slatted spider-frame, to which a number of spirally-arranged combined band-cutters and grain-spreaders 8 are secured. These combined band-cutters and grain-spreaders are fastened to the slats 7 by means of lugs 9 or other suitable fastenings in any convenient and durable manner. Each spiral cutter and spreader is formed for a part of its length with a cutting edge 10, adapted to sever the bands of the grain bundles or gavels, after which the spiral portion of the device will spread the grain laterally to assist in feeding it properly to the cylinder of the thresher. This cutting part 10 is preferably in disk form and arranged at right angles to the shaft 5 between and in immediate contact with two spiral portions of the combined cutter and spreader. On the spiral portion of each combined cutter and spreader there is a series of teeth 11, which exert a combing action to straighten the straw, so that the grain bundles will feed evenly to the cylinder. The spiral arrangement of the combined band-cutters and grain-spreaders 8 and the manner in which they are mounted—namely, on the slats 7 of the rotary spider-frame—will prevent the straw from winding around the cutter-shaft 5 and will cause the grain to be spread evenly on the grain-feeder or bundle-carrier.

The grain bundles or gavels are carried to the rotary band-cutter and spreaders by means of a feeder composed of endless sprocket-chains 12, to which blocks or bars 13 are attached for carrying the grain forward. At one end of this grain-feeder or bundle-carrier the sprocket-chains 12 are engaged with sprocket-wheels 14, mounted on a transversely-arranged shaft 15, that is journaled in the lower part of the stationary hood or frame 4, which incloses the rotary band-cutter and grain-spreader. The other ends of these chains 12 are engaged with sprocket-wheels 16, carried on a shaft 17, mounted in the outer portion of a feeder-frame 18, the inner end of which is connected by hinges 19 to the lower portion of the hood 4, inclosing the band-cutter.

A feed-board 20 is placed between the uppermost portions of the carrier-chains 12 to guide and steady the same. One part of this feed-board 20 is supported between the sides of the stationary frame 4 near its bottom and the other part of the board 20 is supported by and carried with the hinged feeder-frame 18, as shown. The feeder-frame 18 may be provided with removable sides 21 and a central longitudinally-arranged division-board or partition 22, as usual. When the band-cutter and grain-feeder is not in use, the sides 21 and partition 22 may be removed and the hinged feeder turned upward out of the way, as shown in Fig. 2.

On the feeder-shaft 17 is a sprocket-wheel 23, which connects by a sprocket-chain 24, Fig. 2, with a sprocket-wheel 25, that is fast with a spur-gear 26, mounted on a spindle supported by the hood 4 of the rotary band-cutter. This spur-gear 26 is driven from a pinion 27 on the shaft 5 of the band-cutter and grain-spreader. On the shaft 5 is a band wheel or pulley 28, to which power may be applied in any convenient manner for driving the rotary band-cutter and grain-spreader and thence the grain-feeder.

The spiral band-cutters and grain-spreaders 8 are arranged on the reel or slatted spider-frame at a pitch of about eight inches, and the shaft 5 of the band-cutter moves at a higher speed than the endless grain-feeder. Thus by reason of the pitch of the spiral cutters and spreaders and the speed at which they are driven the upper part of a grain bundle will be thrown immediately to the cylinder as soon as the bands are severed and before the lower part of the bundle is carried to the cylinder by the slower-moving feeder. Consequently the grain cannot choke the passage to the cylinder, but will pass thereto evenly and without clogging.

It will be seen that the hood or frame 4 has a closed bottom 29 and that the bottom of the hinged feeder-frame 18 is also closed.

A sheet-iron strip or plate 30 connects the hood-bottom 29 with the concave 3, and thus with the closed bottom of hood and feeder there can be no spilling or waste of grain. When the hinged grain-feeder 18 is turned down to a working position, it may be supported by a hooked rod or rods 31 or otherwise.

With this grain-feeder and band-cutter the gavels can be carried forward very rapidly and uniformly, the bands severed, and the grain fed to the cylinder evenly and without choking and waste. Should the cutting edges 10 become dulled by running in straw for a length of time, the bands will still be severed or broken by the teeth 11 on the spreaders of spiral pitch and the severed bundles will pass on to the cylinder without hindrance.

What I claim as my invention is—

In a grain-feeder and band-cutter for threshing-machines, the combination with the cylinder, the concave, and the bundle-carrier, of a rotary shaft having spider-arms attached thereto at intervals, slats secured to the extremities of said arms with their flat sides toward and parallel with said shaft, a plurality of combined cutters and spreaders secured to and around said slats and each consisting of a disk-shaped cutter portion and toothed spirally-arranged spreader portions in immediate contact with both sides of each cutter-disk, a hood inclosing said cutters and spreaders, and the upwardly-folding hinged feeder-frame, substantially as shown and described.

In testimony whereof I have hereunto set my hand in presence of two subscribing witnesses.

FEIKE H. ACKERMAN.

Witnesses:
E. W. SHEDD,
N. P. CUNNE.